United States Patent [19]
Matui

[11] Patent Number: 5,903,556
[45] Date of Patent: *May 11, 1999

[54] CODE MULTIPLEXING COMMUNICATION SYSTEM

[75] Inventor: Hitosi Matui, Tokyo, Japan

[73] Assignee: NEC Corporation, Japan

[ * ] Notice: This patent is subject to a terminal disclaimer.

[21] Appl. No.: 08/757,217

[22] Filed: Nov. 27, 1996

[30] Foreign Application Priority Data

Nov. 30, 1995 [JP] Japan .................................. 7-312392

[51] Int. Cl.⁶ .......................... H04B 7/216; H04B 15/00; H03K 7/00
[52] U.S. Cl. .......................... 370/342; 375/200; 375/229; 370/335
[58] Field of Search .................................. 370/342, 335; 375/200, 208–209, 229, 230, 236, 367; 364/724.2, 728.03

[56] References Cited

U.S. PATENT DOCUMENTS

| | | | |
|---|---|---|---|
| 4,730,341 | 3/1988 | Saito | 375/229 |
| 5,077,753 | 12/1991 | Grau, Jr. et al. | 375/200 |
| 5,119,401 | 6/1992 | Tsujimoto | 370/230 |
| 5,144,641 | 9/1992 | Akazawa et al. | 375/200 |
| 5,291,515 | 3/1994 | Uchida et al. | 375/200 |
| 5,583,851 | 12/1996 | Kato et al. | 370/342 |
| 5,668,806 | 9/1997 | Arai et al. | 370/342 |

OTHER PUBLICATIONS

"small–size, High Data Rate Wireless LAN modem using Multi Code Direct Sequence (MCDS) Spread Spectrum", Technical Report of the Institute of Electronics, Information and Communications, RCS94–63, pp.25–30, Sep. 1994, M. Fukushi, et al.

Primary Examiner—Chi H. Pham
Assistant Examiner—Steven Nguyen
Attorney, Agent, or Firm—Ostrolenk, Faber, Gerb & Soffen, LLP

[57] ABSTRACT

In a code multiplexing communication system, a transmission apparatus includes a code generator, a signal distribution unit, spreading units, a synthesizer, and a modulator, and a reception apparatus includes a correlator, an equalizer, demodulators, and a coupler. The code generator generates n spreading code series which are generated at timings different from the timing of a predetermined spreading code. The signal distribution unit divides a serial input signal having n×m bits per symbol timing into n parallel signals each consisting of m bits. The spreading units respectively spectrum-spread the n m-bit output signals by using the n output signals from code generator. The synthesizer synthesizes the output signals from the spreading units. The modulator modulates the output signal from the synthesizer. The correlator calculates the correlation between a baseband signal and the spreading code. The equalizer removes a delay distortion caused by a radio transmission path from the output signal from the correlator, and separates the signal into n signals. The demodulators respectively demodulate the n output signals from the equalizer and extract m-bit parallel signals. The coupler synthesizes the m-bit output signals from the demodulators and outputs a serial signal.

12 Claims, 11 Drawing Sheets

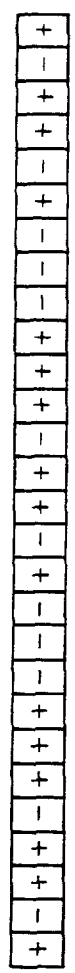
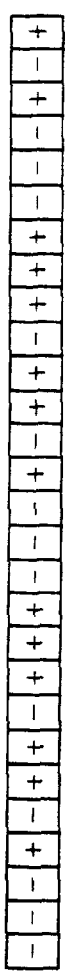
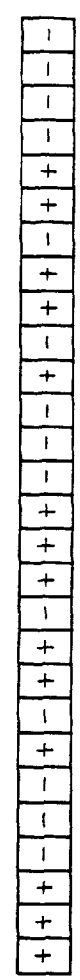
FIG. 8A DIVIDING UNIT OUTPUT 601a
FIG. 8B 0-CHIP DELAY UNIT OUTPUT 605
FIG. 8C CODE OUTPUT 704
FIG. 8D DIVIDING UNIT OUTPUT 601b
FIG. 8E 3-CHIP DELAY UNIT OUTPUT 606
FIG. 8F CODE OUTPUT 705
FIG. 8G DIVIDING UNIT OUTPUT 601c
FIG. 8H 6-CHIP DELAY UNIT OUTPUT 607
FIG. 8I CODE OUTPUT 706

CODE MULTIPLEXING COMMUNICATION SYSTEM

BACKGROUND OF THE INVENTION

The present invention relates to a code multiplexing communication system used for a wireless local area network (LAN).

Wireless LANs are much more flexible than conventional wire LANs in terms of the locations and movement of terminals. However, since frequencies used for a wireless LAN are limited, it is difficult to increase the number of communication lines in accordance with the number of users as in a wire LAN. A 2.4-GHz ISM (Industrial, Scientific and Medical use) band is one of the frequency bands that the wireless LAN can use. This band is also used for RF heating and the like. For this reason, in order to share the ISM band, it is mandatory to use a spectrum spread scheme in the wireless LANs. In addition, since the bandwidth is limited to 26 MHz in Japan, the transmission rate limit in the conventional wireless LANs is 2 Mbps. At a transmission rate of 2 Mbps, however, the transmission rate per user decreases with an increase in the number of users.

FIG. 2 shows a conventional modulation amplification scheme. FIG. 2 shows the arrangement of a wireless LAN based on the scheme recommended by IEEE 802.11.

The signal transmission rate is 2 Mbps, and a 11-bit Barker code is used as a spreading code for spectrum spread. A spreading code is output from a spreading code generator 203 at a chip rate of 11 MHz. As shown in FIG. 3, a 11-bit Barker code has an auto-correlation value of +1. The correlation value of a Barker code having undergone a timing shift is $-1/11$ or 0.

One-bit serial data input through a terminal 200 of a transmission apparatus 220 is converted into 2-bit parallel data by a serial/parallel (S/P) converter 201. A spreading unit 202 multiplies the output signal from the S/P converter 201 by a spreading code output from the spreading code generator 203. The output signal from the spreading unit 202 is modulated and converted into an RF signal by an analog transmission processor 204. The RF signal is then output to the air through the antenna.

In a reception apparatus 230, the signal received through the antenna is amplified and converted into a baseband signal by an analog reception processor 205. A correlator 206 calculates the correlation between the baseband signal and the Barker code. As shown in FIG. 4, the correlator 206 is constituted by cascaded delay elements 401 each having a delay corresponding to a chip rate, multipliers 402 each serving to multiply an output from a corresponding one of the delay elements 401 by ±1, and adders 403 each serving to add an output from a corresponding one of the multipliers 402, an input signal, and a sum output from the preceding multiplier 402. The multipliers "+1" and "-1" are identical to a Barker code series.

In the correlator 206, a delayed wave caused by multipath reflection in a transmission path is decomposed in units of chips upon spectrum spread, as shown in FIG. 5. Only the chip signal having the maximum correlation value is extracted, but the remaining chip signals produced by the delayed wave are discarded, thereby reducing the distortion caused by the delayed wave. The output signal from the correlator 206 is demodulated by a demodulator 207, and converted into 2-Mbps serial data by a P/S converter 208. The serial data is then output to an output terminal 209.

Means for increasing the transmission rate on the basis of conventional techniques include a method of increasing the symbol rate and a method of increasing the number of bits per symbol.

In the method of increasing the symbol rate, a spreading ratio must be 10 or more, and the band width is limited to 26 MHz in Japan. Owing to such limitations, the transmission rate cannot be expected to be doubled or more.

The method of increasing the number of bits per symbol includes a method using a multiple-PSK or QAM. However, since the signal quality greatly deteriorates due to the influences of delay distortions and the like, and a high arithmetic processing precision is required, it is technically difficult to use such a method. For example, in order to obtain a transmission rate twice that of QPSK, signal multiplexing higher in degree than that of hexadecimal QAM is required. Hexadecimal QAM requires power 10 times that required by QPSK, and is more susceptible to amplification distortions. For this reason, in order to obtain the performance equivalent to that of QPSK, the loads on devices need to be considerably increased. In addition, this method becomes susceptible to the influences of distortions in transmission paths, resulting in a smaller service area.

SUMMARY OF THE INVENTION

It is an object of the present invention to provide a code multiplexing communication system which can perform transmission at a high bit rate.

It is another object of the present invention to provide a code multiplexing communication system suitably applied to a wireless LAN.

In order to achieve the above objects, according to the present invention, there is provided a code multiplexing communication system for transmitting a digital signal from a transmission apparatus to a reception apparatus through a radio transmission path by using spectrum spread, the transmission apparatus comprising code generating means for generating n (n is an integer not less than two) spreading code series which are generated at timings different from a timing of a predetermined spreading code, signal distribution means for dividing a serial input signal having n×m bits (m is an integer not less than one) per symbol timing into n parallel signals each consisting of m bits, n spreading means for respectively spectrum-spreading the n m-bit output signals from the signal distribution means by using the n output signals from the code generating means, synthesizing means for synthesizing the output signals from the spreading means, and modulation means for modulating the output signal from the synthesizing means, and the reception apparatus comprising correlation means for calculating a correlation between a baseband signal obtained from a reception signal and a spreading code used by the code generating means, equalization means for removing a delay distortion caused by the radio transmission path from the output signal from the correlation means and separating the signal into n signals, n demodulation means for respectively demodulating the n output signals from the equalization means and extracting m-bit parallel signals, and coupling means for synthesizing the m-bit output signals from the demodulation means and outputting a serial signal.

BRIEF DESCRIPTION OF THE DRAWINGS

FIGS. 8A to 8I are timing charts of the signal distribution unit and the code generator in FIGS. 6 and 7;

DESCRIPTION OF THE PREFERRED EMBODIMENT

The present invention will be described below with reference to the accompanying drawings.

Figure 1:
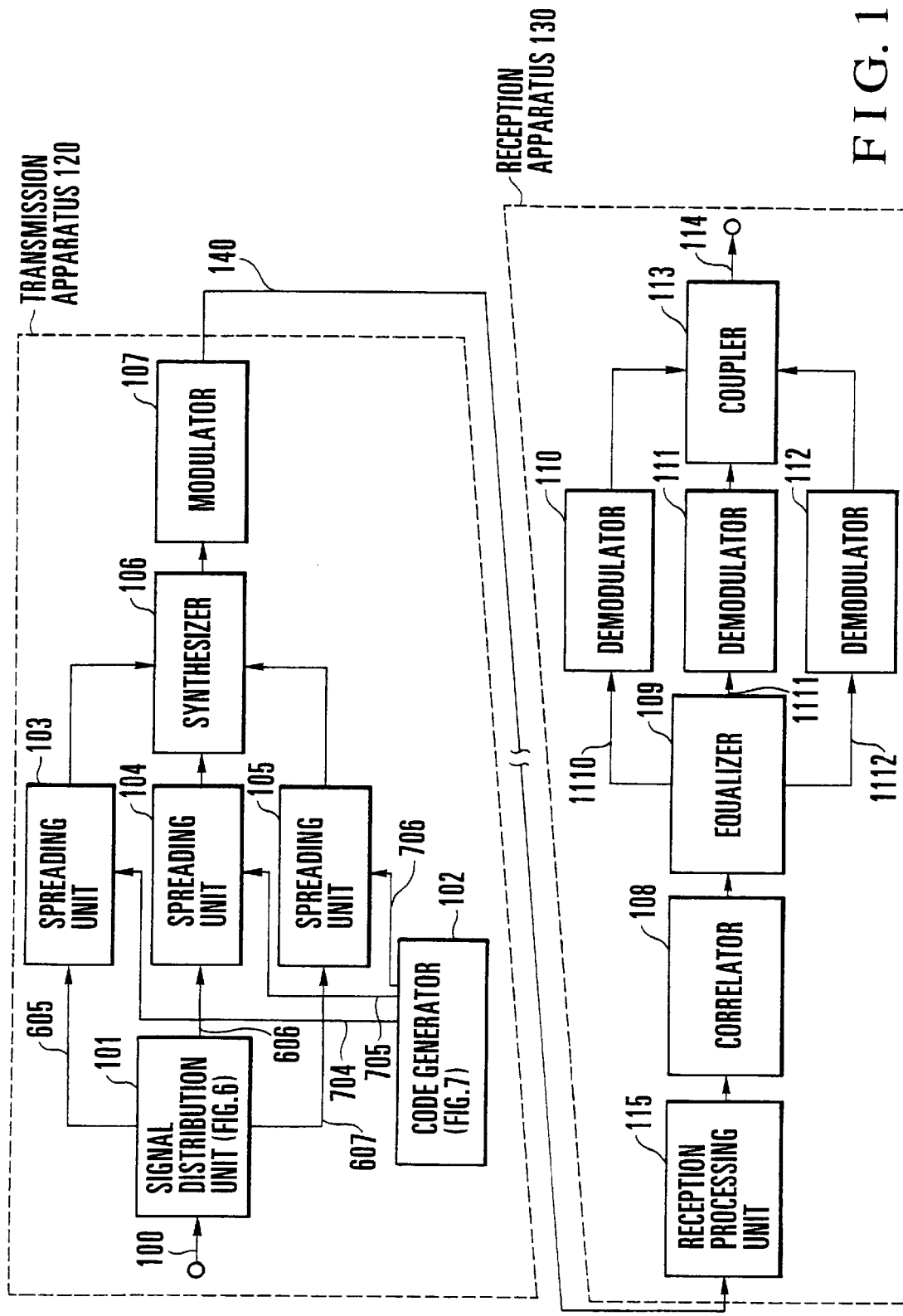
FIG. 1 is a block diagram showing a code multiplexing communication system according to an embodiment of the present invention.
Figure 2:
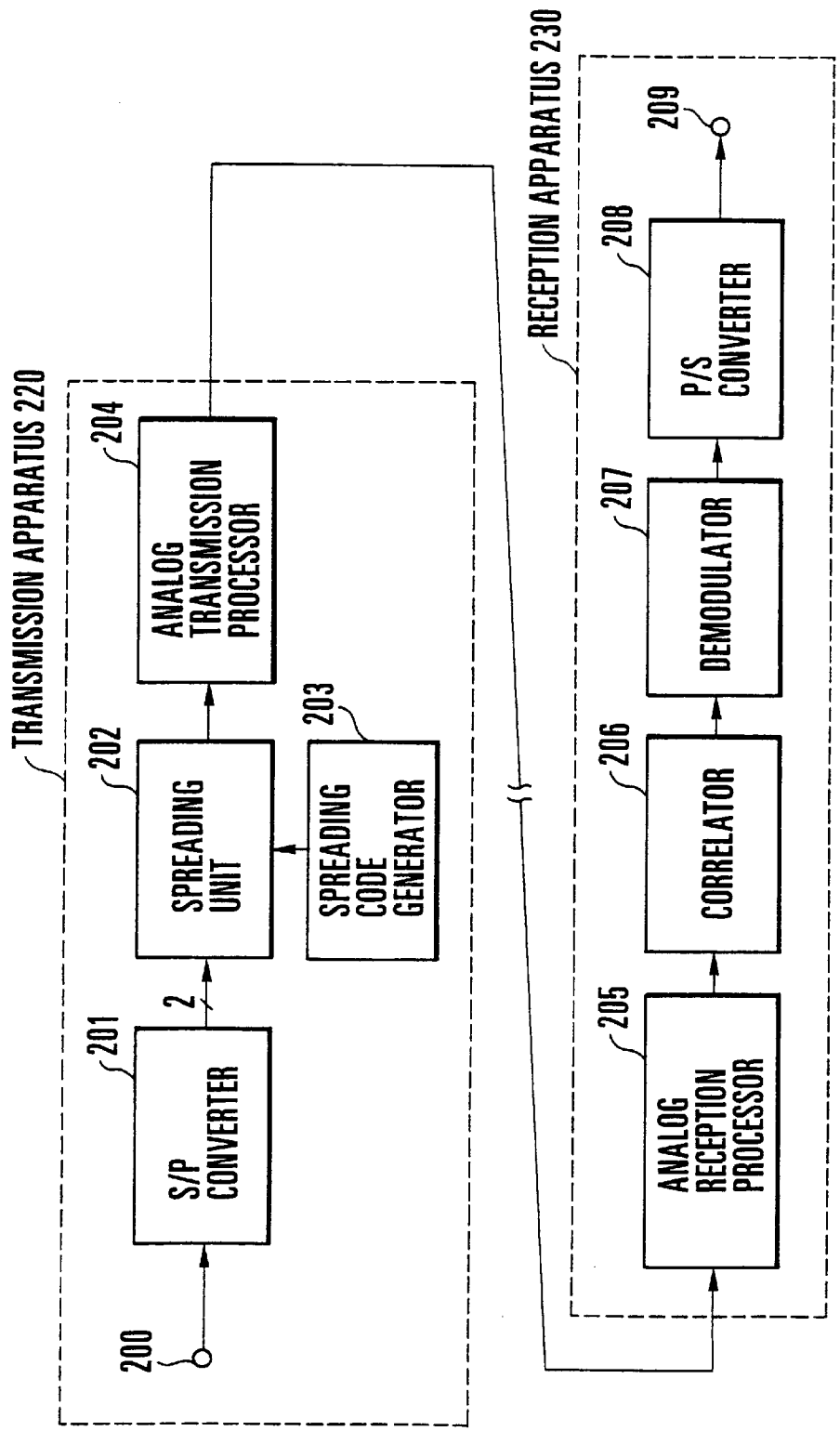
FIG. 2 is a block diagram showing a conventional code multiplexing communication system.
Figure 3:
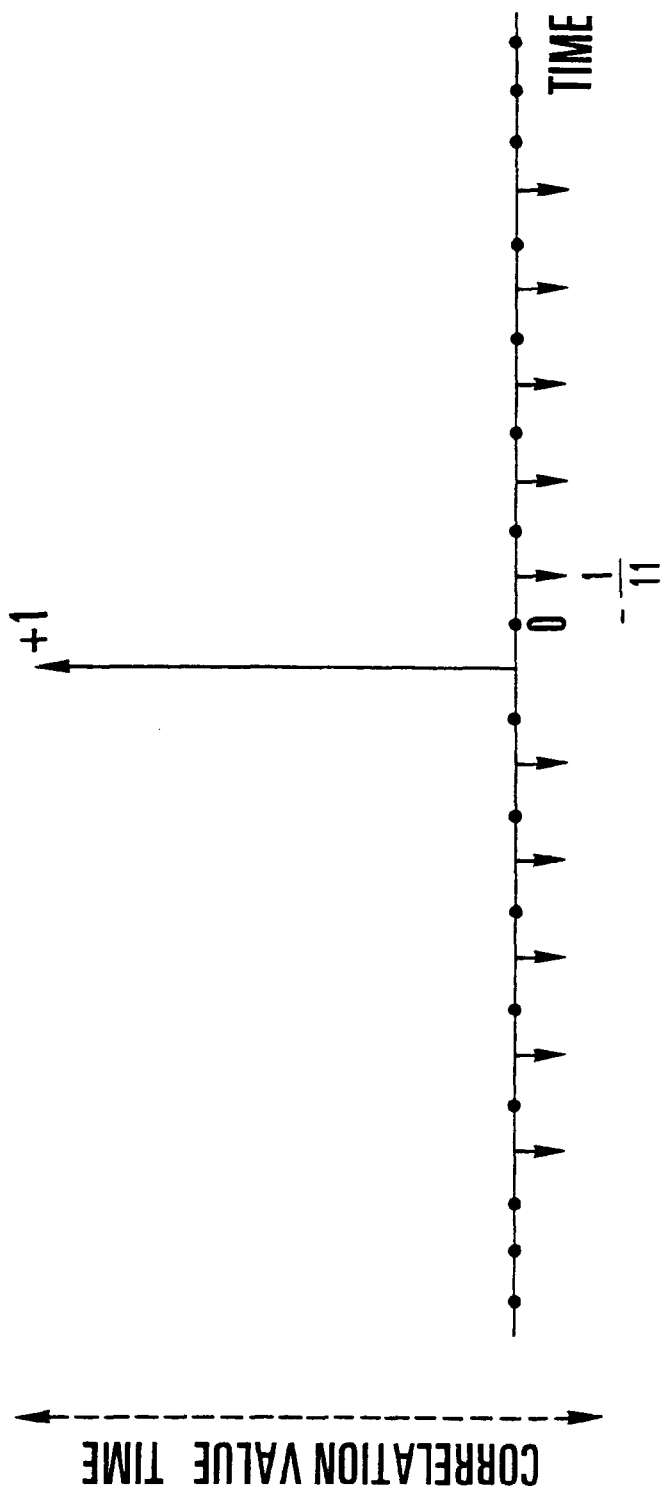
FIG. 3 is a graph showing the auto-correlation value of an 11-bit Barker code.

FIG. 1 shows a code multiplexing communication apparatus according to an embodiment of the present invention.

In the arrangement shown in FIG. 1, the code multiplexing count is "3", quaternary PSK with a symbol rate of 1 MHz is used as a modulation scheme, an 11-bit Barker code is used as a spreading code, and the transmission bit rate is 6 Mbps. Referring to FIG. 1, reference numeral 120 denotes a transmission apparatus; and 130, a reception apparatus for receiving signals from the transmission apparatus 120 through a radio transmission path 140.

The transmission apparatus 120 includes a code generator 102 for generating signals 704, 705, and 706 from a Barker code at different timings, a signal distribution unit 101 for outputting signals 605, 606, and 607 obtained by dividing a serial input signal into parallel signals each consisting of a plurality of bits, spreading units 103, 104, and 105 for respectively spectrum-spreading the output signals 605, 606, and 607 from the signal distribution unit 101 with the output signals 704, 705, and 706 from the code generator 102, a synthesizer 106 for synthesizing the output signals from the spreading units 103, 104, and 105, and a modulator 107 for modulating the output signal from the synthesizer 106 and outputting the resultant signal to the transmission path 140. Note that a baseband signal arithmetic processing section is constituted by the signal distribution unit 101, the code generator 102, the spreading units 103, 104, and 105, and the synthesizer 106.

The reception apparatus 130 includes a reception processing unit 115 for receiving a signal from the radio transmission path 140, and converting the reception signal into a baseband signal, a correlator 108 for calculating the correlation between the baseband signal from the reception processing unit 115 and the Barker code, an equalizer 109 for separating a signal from the output signal from the correlator 108, from which a delay distortion caused in the radio transmission path 140 is removed, demodulators 110, 111, and 112 for demodulating the output signal separated by the equalizer 109 to extract parallel signals, and a coupler 113 for synthesizing the output signals from the respective modulators 110, 111, and 112 and outputting the resultant serial signal. Note that a baseband signal arithmetic processing section is constituted by the correlator 108, the equalizer 109, the demodulators 110, 111, and 112, and the coupler 113.

Figure 6:
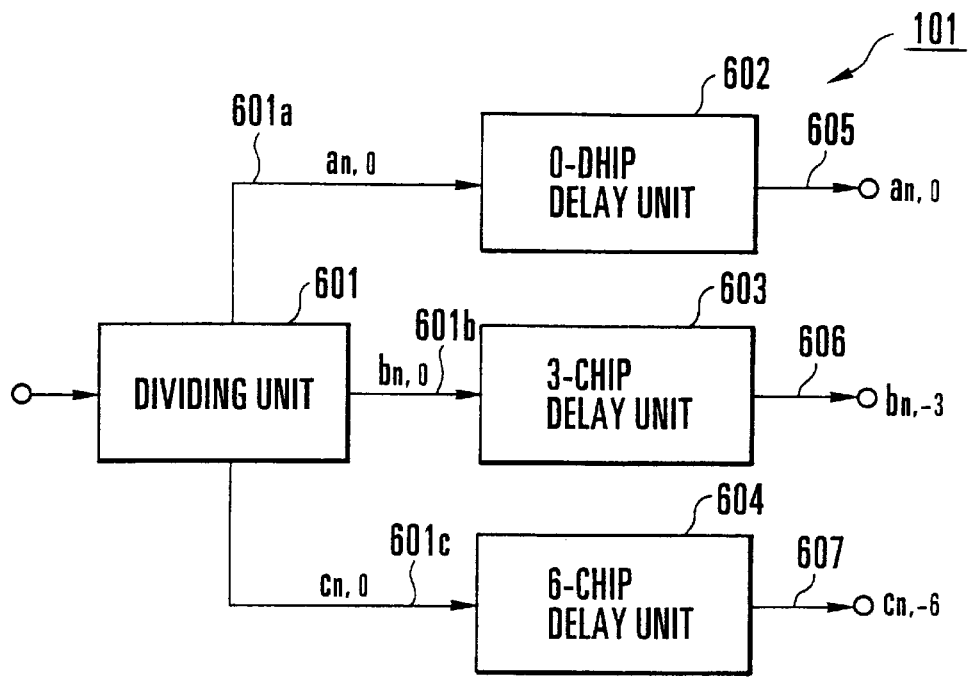
FIG. 6 is a block diagram showing a signal distribution unit in FIG. 1.

In the transmission apparatus 120, a signal 100 with a bit rate of 6 Mbps is divided into three 2-Mbps signals by the signal distribution unit 101. As shown in FIG. 6, the signal distribution unit 101 is constituted by a dividing unit 601 and three delay units 602, 603, and 604. If a chip period (the reciprocal of 11 MHz) is represented by $\tau$, the 0-chip delay unit 602, the 3-chip delay unit 603, and the 6-chip delay unit 604 output signals with delays of $0\tau$, $3\tau$, and $6\tau$, respectively. Note that the 0-chip delay unit 602 is not always required because its delay is substantially 0.

Figure 7:
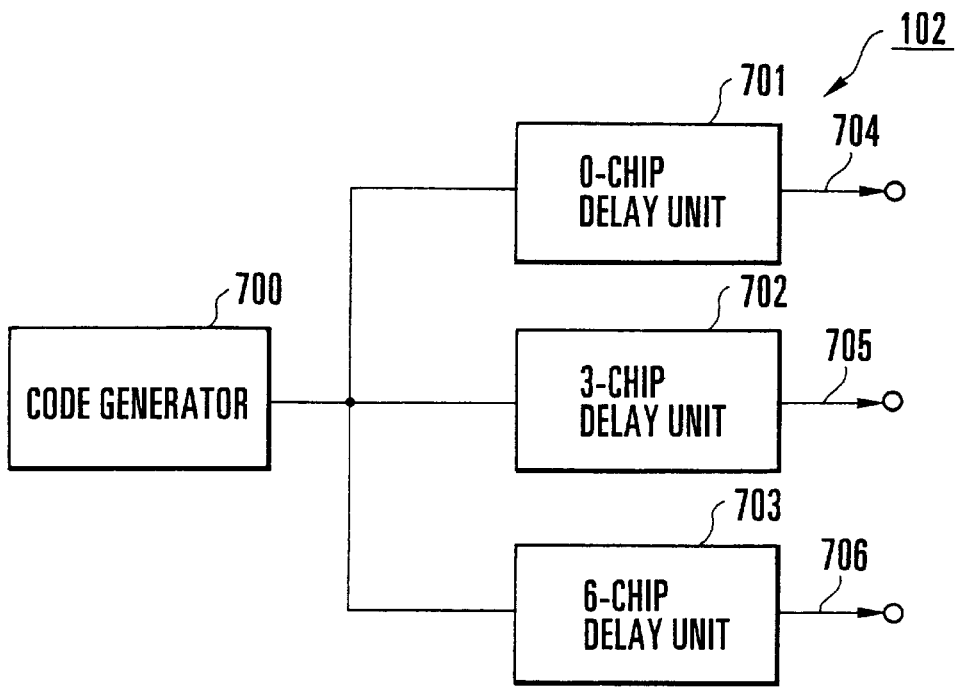
FIG. 7 is a block diagram showing a code generator in FIG. 1.

In the code generator 102 shown in FIG. 7, a code generator 700 outputs a 11-bit Barker code in units of bits at the chip period $\tau$. The output signals from the code generator 700 are respectively delayed by a 0-chip delay unit 701, a 3-chip delay unit 702, and a 6-chip delay unit 703 and output therefrom.

FIGS. 8A to 8I show the timings of signals in the signal distribution unit 101 and the code generator 102. The output signals 605, 606, and 607 from the signal distribution unit 101 in FIGS. 8B, 8E, and 8H are output at the same timings as those of the output signals 704, 705, and 706 from the code generator 102 by respectively delaying dividing unit outputs 601a, 601b, and 601c by predetermined amounts. The spreading units 103, 104, and 105 respectively spectrum-spread the output signals 605, 606, and 607 from the signal distribution unit 101 by using the output signals 704, 705, and 706 from the code generator 102.

The signals spread by the spreading units 103, 104, and 105 are added by the synthesizer 106. The resultant signal is modulated by the modulator 107 and subjected to frequency conversion. The resultant signal is then output as a transmission signal to a radio transmission path 140.

Figure 4:
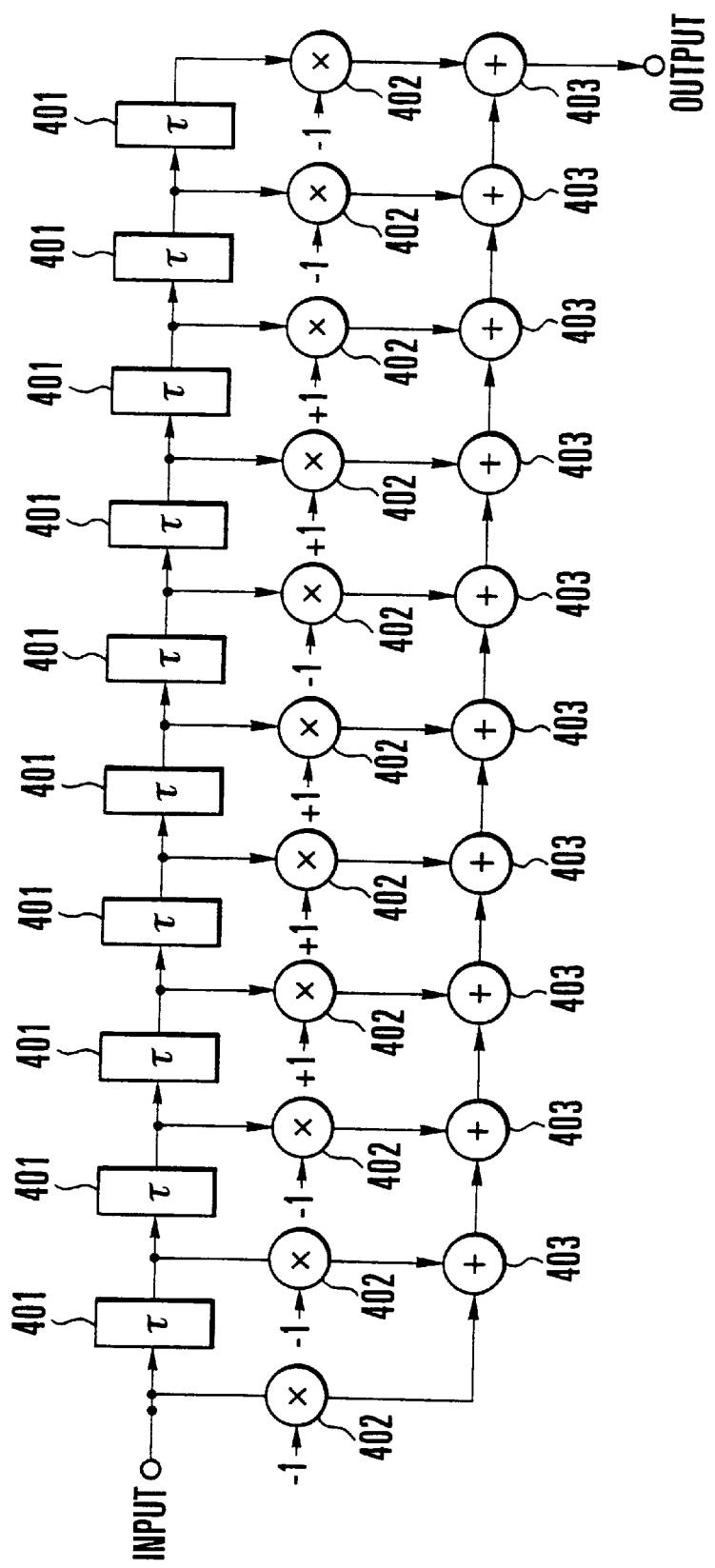
FIG. 4 is a block diagram showing a correlator in FIGS. 1 and 2.
Figure 5:
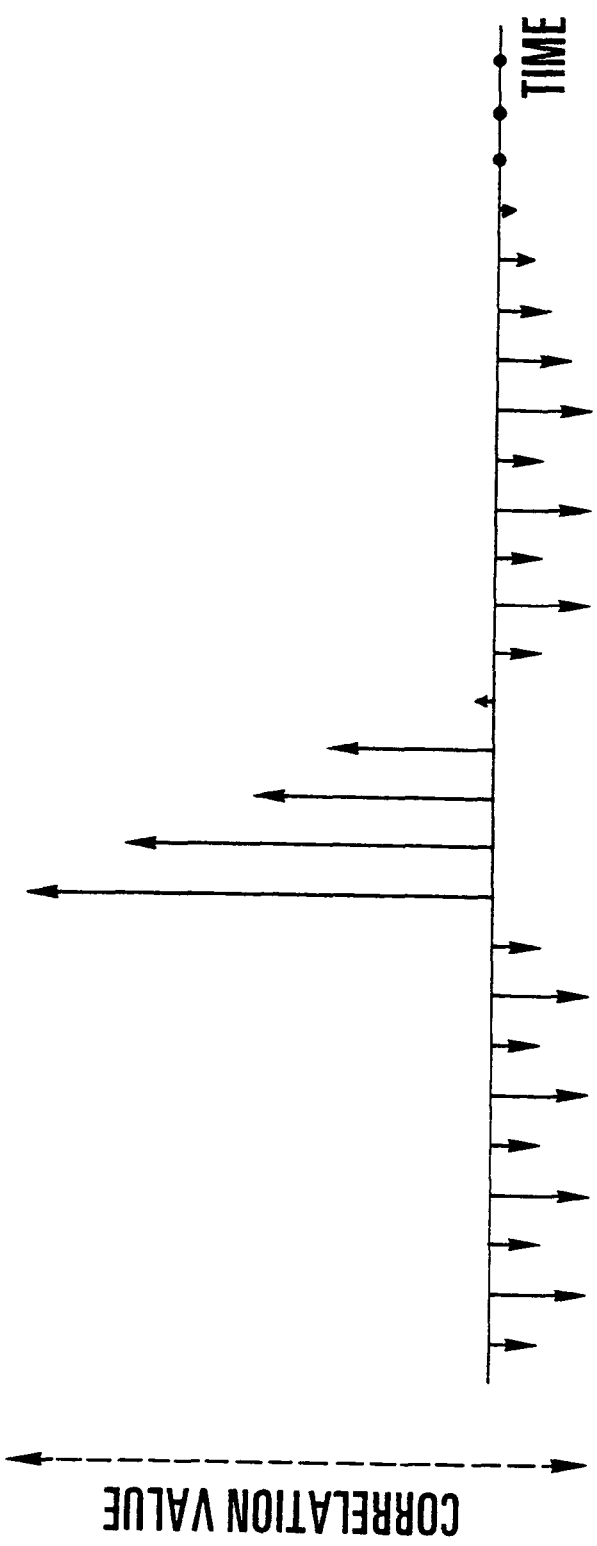
FIG. 5 is a graph showing an output signal from the correlator in the presence of a delay distortion.

In the reception apparatus 130, a reception signal is converted into a baseband signal by the reception processing unit 115. The baseband signal is spectrum-spread by the correlator 108. The correlator 108 has the same arrangement as that shown in FIG. 4, and calculates the correlation between the baseband signal and the spreading code. FIG. 9B shows the output signal from the correlator 108 in the absence of a delay distortion in the transmission path. As shown in FIG. 9B, the triple-multiplexed signal exhibits the influences of multiplexing. However, the respective signals can be separated. For this reason, signal transmission can be performed at a speed higher than that in the prior art by multiplexing signals upon shifting the timing of spreading on the transmission side.

Figure 9A:
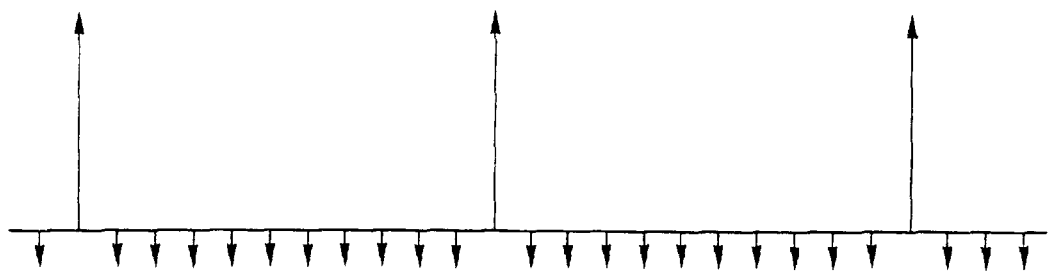
FIGS. 9A and 9B are graphs showing auto-correlation values with respect to multiplexing.
Figure 9B:
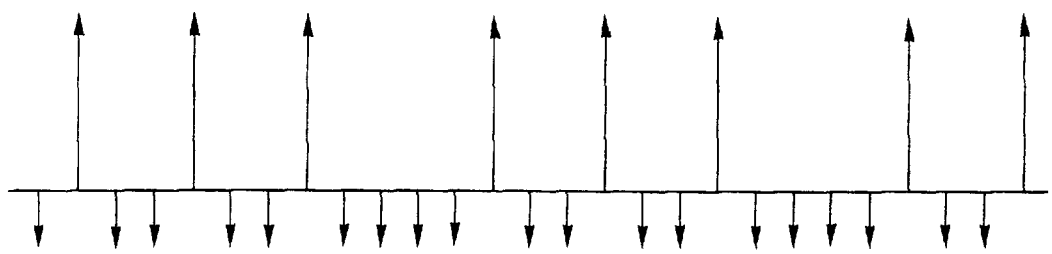

FIG. 9A shows an output signal from the correlation in the prior art without multiplexing. Values with high correlation values are output every 11 chips. The output signal shown in FIG. 9B corresponds to the correlation values obtained by triple-multiplexing. When triple-multiplexing is performed, the influence of the phenomenon that the auto-correction value is not 0 at points other than the peak points cannot be neglected.

Figure 10A:
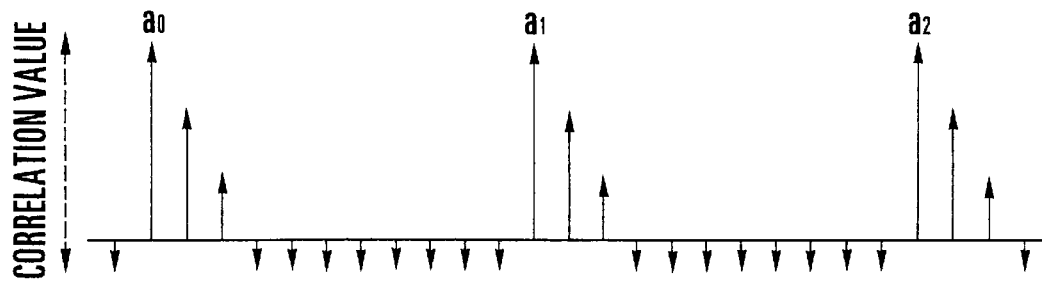
FIGS. 10A to 10D are graphs showing the influences of delay distortions in multiplexing.

In an indoor radio transmission path, there are many reflected waves produced by reflections on wall surfaces as well as direct waves. Since the propagation time of a reflected wave is longer than that of a direct wave, the reflected wave is received as a signal with a delay distortion by the receiver. FIG. 10A shows an output signal from the correlator which is obtained when a single-multiplexed signal is transmitted in an environment with a relatively small delay distortion.

Figure 10B:
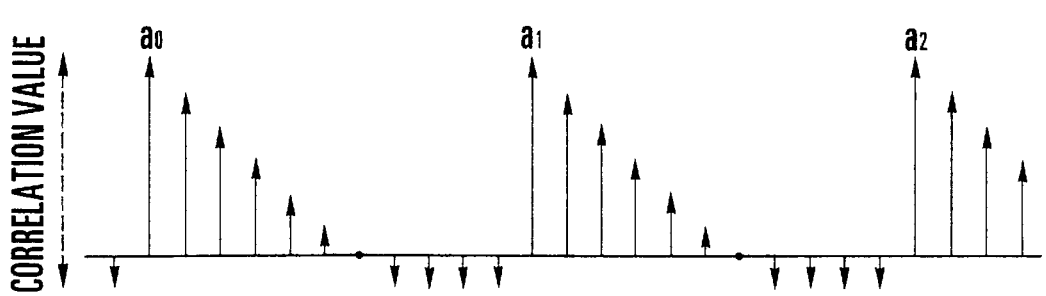
Figure 10C:
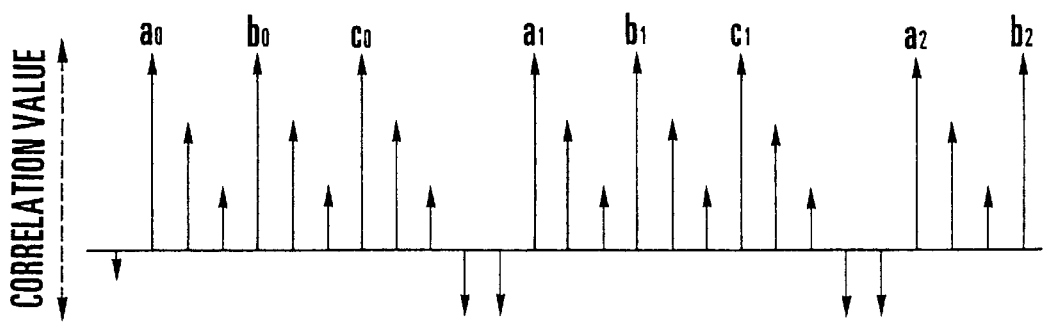
Figure 10D:
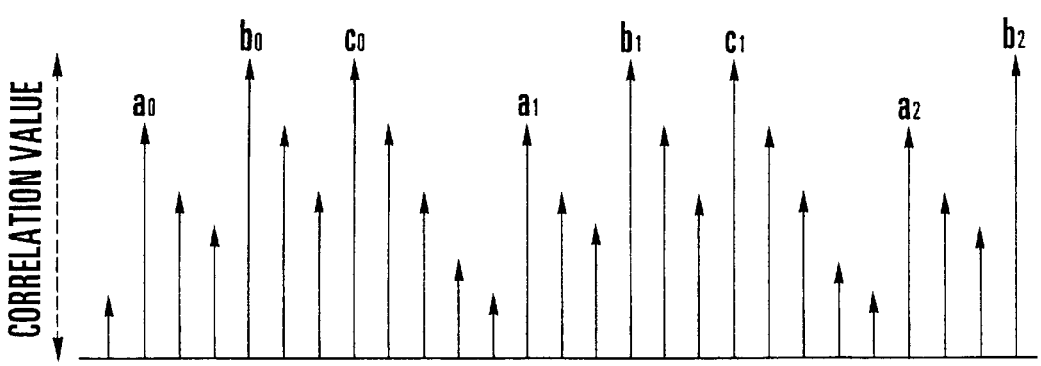

FIG. 10B shows an output signal from the correlator which is obtained when a single-multiplexed signal is transmitted in an environment with a large delay distortion. In either case, since the delay distortion amount is small as compared with the symbol period, almost no deterioration in transmission performance is caused by the delay distortion. FIGS. 10C and 10D show output signals obtained by triple-multiplexing. FIG. 10C shows the output from the correlator in an environment with a small delay distortion. With such a delay distortion, transmission can be performed by triple-multiplexing without posing any problem. However, as shown in FIG. 10D, in an environment with a large delay distortion, signals interfere with each other, and hence the reception characteristics deteriorate. As described above, with an increase in multiplexing count, the deterioration due to a delay distortion proportionally worsens.

Figure 11:
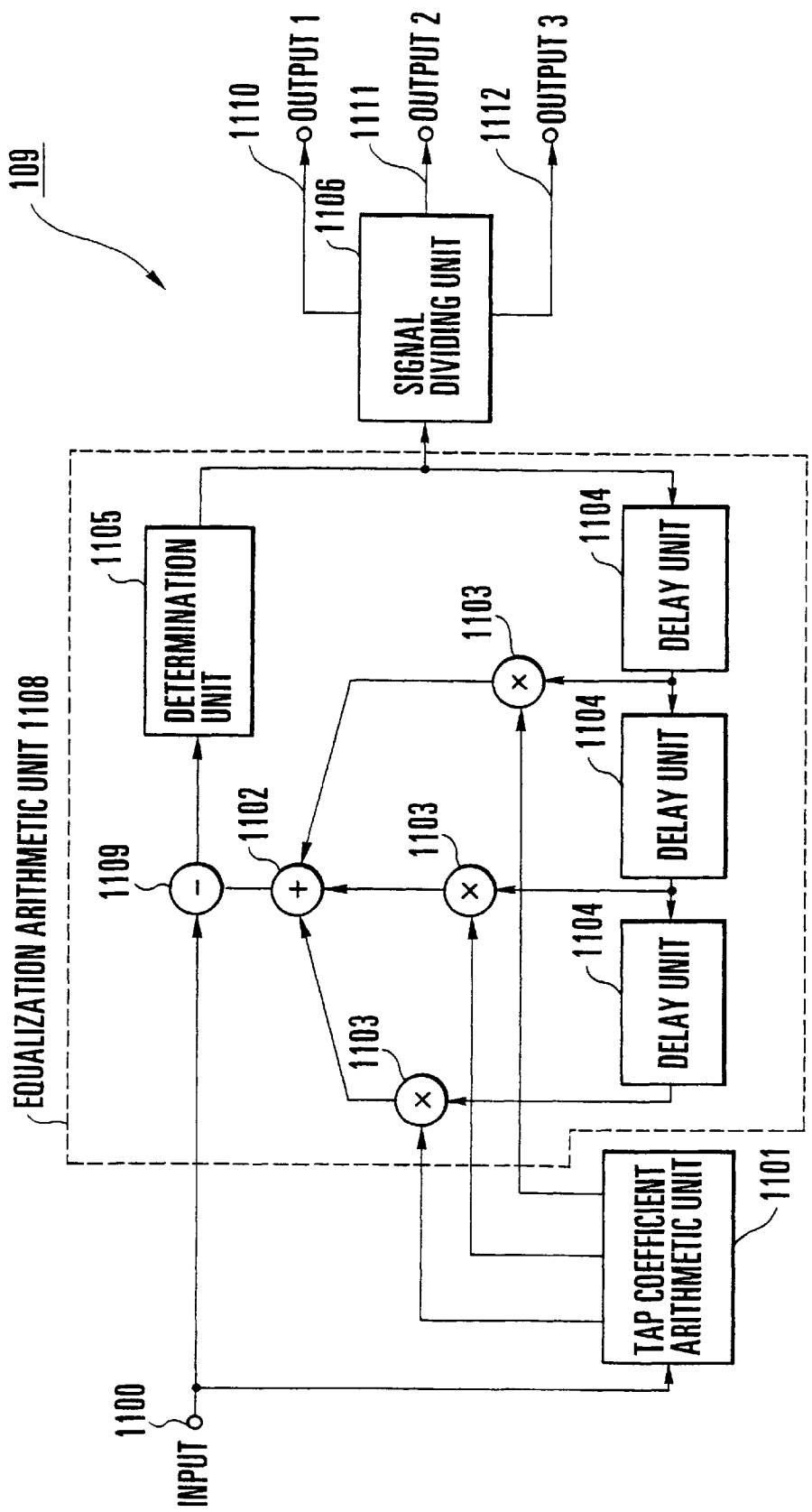
FIG. 11 is a block diagram showing an equalizer in FIG. 1.

The equalizer 109 is required to prevent the deterioration due to a delay distortion. As shown in FIG. 11, equalization processing is performed by an equalization arithmetic unit 1108 having a determination feedback type structure. The basic principle of the equalization arithmetic unit 1108 is a scheme of canceling delayed reflected waves by using the principal wave. If the levels of reflected waves delayed with respect to the principal wave are known, they can be accurately canceled. In general, however, the levels of reflected waves cannot be known in advance on the reception side. For this reason, the levels of reflected waves are determined by the following method.

First of all, a preamble signal with a multiplexing count of "1" is transmitted before a data signal. If the multiplexing count is set to "1", since signals do not interfere with each other unlike the case of a multiplexing count of "3", the level of each wave delayed with respect to the principal wave can be known. A tap coefficient arithmetic unit 1101 obtains the average value of the levels of some delayed waves of the preamble signal input through an input terminal 1100. By performing time averaging, the influences of noise can be removed, and a more accurate tap coefficient can be obtained.

In data transmission, the signal input through the input terminal 1100 is input to a subtracter 1109. The subtracter 1109 removes only the distortion component from the signal. A determination unit 1105 determines "+" or "−". As a result, the noise component is removed. The output signal from the determination unit 1105 is output as an equalization signal to a signal dividing unit 1106, and is also output to cascaded delay units 1104. A replica signal of a reflected wave is generated on the basis of the outputs from the delay units 1104, multipliers 1103, and an adder 1102, and output to the subtracter 1109. The level of a reflected wave input to each multiplier 1103 is supplied from the tap coefficient arithmetic unit 1101.

Figure 12A:
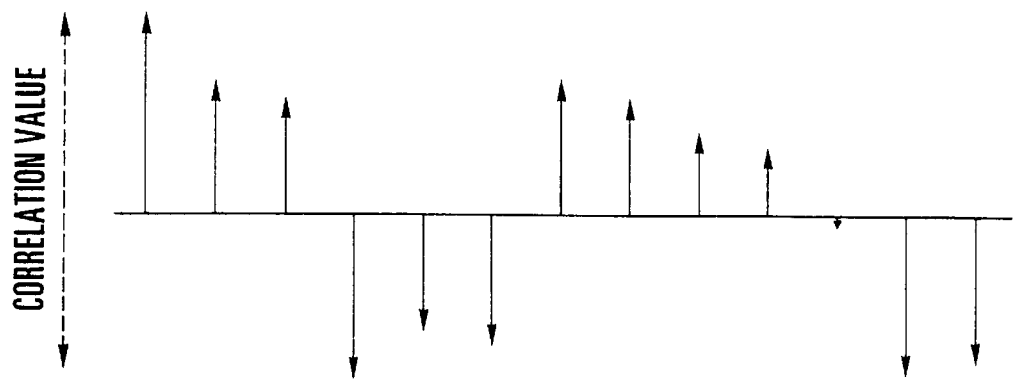
FIGS. 12A to 12C are graphs showing input/output signals to/from the equalizer in FIG. 11.
Figure 12B:
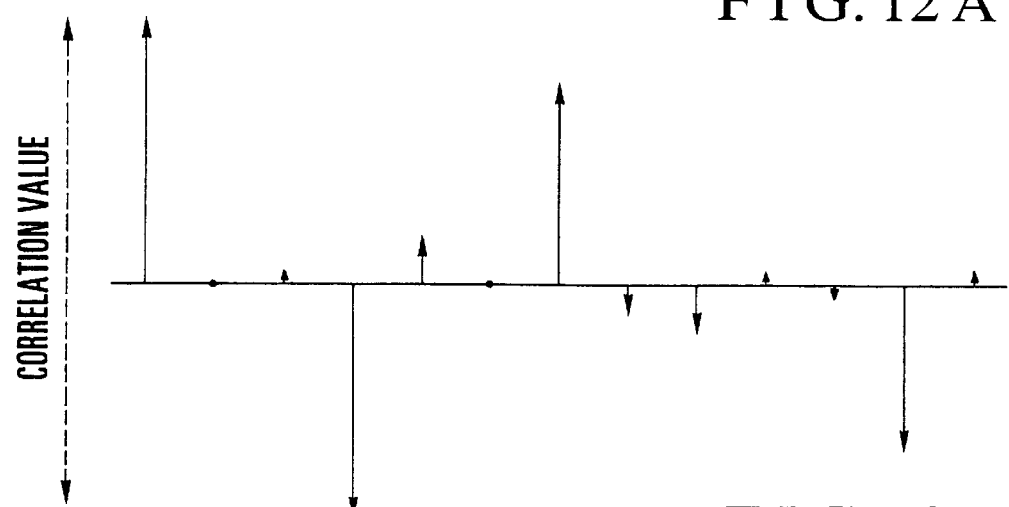
Figure 12C:
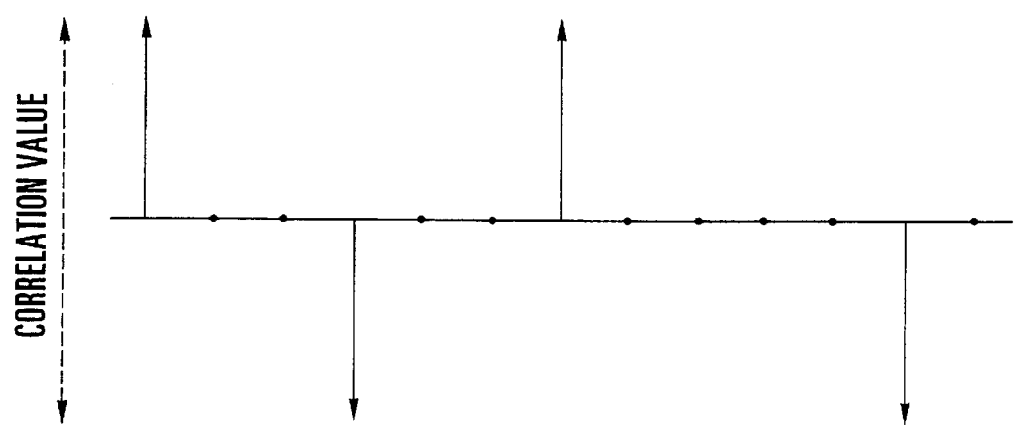

FIG. 12A shows an input signal 1100 obtained when the multiplexing count is 1131. FIG. 12B shows an input signal to the determination unit 1105. FIG. 12C shows an output signal from the determination unit 1105.

The multiplexed signal from which the influences of the delay distortion have been removed is divided into a plurality of signals by the signal dividing unit 1106, and the respective signals are output. Output equalization signals 1110, 1111, and 1112 are sent to the demodulators 110, 111, and 112. The demodulators 110, 111, and 112 perform demodulation to output 2-Mbps signals. The coupler 113 performs the reverse process to that performed by the signal distribution unit 101 with respect to the output signals from the demodulators 110, 111, and 112, thereby outputting a 6-Mbps serial signal 114.

As has been described above, according to the present invention, since code multiplexing is performed by using a code series obtained by shifting the timing of a spreading code, the transmission rate can be increased by three times that in the prior art. In addition, the optimal transmission rate can be obtained in accordance with a propagation environment by changing the multiplexing count. Furthermore, since transmission/reception of signals to/from a conventional apparatus without multiplexing can be performed by setting the multiplexing count to "1", this apparatus can be used together with a conventional apparatus on the same floor.

What is claimed is:

1. A code multiplexing communication system for transmitting a digital signal from a transmission apparatus to a reception apparatus through a radio transmission path by using spectrum spread, said transmission apparatus comprising:
code generating means for generating n (n is an integer not less than two) spreading code series which are generated at timings different from a timing of a predetermined spreading code;
signal distribution means for dividing a serial input signal having n×m bits (m is an integer not less than one) per symbol timing into n parallel signals each consisting of m bits;
n spreading means for respectively spectrum-spreading the n m-bit output signals from said signal distribution means by using the n output signals from said code generating means;
synthesizing means for synthesizing the output signals from said spreading means; and
modulation means for modulating the output signal from said synthesizing means, and said reception apparatus comprising:
correlation means for calculating a correlation between a baseband signal obtained from a reception signal and a spreading code used by said code generating means;
equalization means for removing a delay distortion caused by the radio transmission path from the output signal from said correlation means and separating the signal into n signals;
n demodulation means for respectively demodulating the n output signals from said equalization means and extracting m-bit parallel signals; and
coupling means for synthesizing the m-bit output signals from said demodulation means and outputting a serial signal.

2. A system according to claim 1, wherein said signal distribution means comprises:
a dividing unit for dividing an input signal into n m-bit data; and
n delay units which have different delay amounts and respectively delay the n output signals from said dividing unit by delays corresponding to timing differences between the n output signals.

3. A system according to claim 1, wherein said equalization means comprises:
a tap coefficient arithmetic unit for obtaining a multipath distortion upon reception of a training signal on the basis of the output signal from said correlation means, and outputting the distortion as a tap coefficient;
an equalization arithmetic unit for performing equalization processing of the output signal from said correlation means by using the tap coefficient from said tap coefficient arithmetic unit upon reception of a data signal; and a signal dividing unit for dividing the output signal from said equalization arithmetic unit into n signals.

4. A system according to claim 1, wherein said code generating means comprises:

a code generator for outputting a spreading code constituted by a plurality of bits in units of bits at a chip period; and n delay units for receiving the spreading code constituted by a plurality of bits and output from said code generator, and respectively outputting n delayed spreading codes with different delay amounts.

5. A system according to claim 1, wherein said correlation means comprises:

a plurality of cascaded delay elements;

a plurality of multipliers for multiplying output signals from said delay elements by ±1 in accordance with a spreading code constituted by a plurality of bits; and a plurality of adders for respectively adding sum signals output from the respective preceding stages and containing the respective output signals from said multipliers and input signals, thereby outputting a sum signal.

6. A system according to claim 1, wherein the spreading code is a 11-bit Barker code.

7. A code multiplexing communication system for transmitting a digital signal from a transmission apparatus to a reception apparatus through a radio transmission path by using spectrum spread, said transmission apparatus comprising:

a spreading code generator generating n (n is an integer not less than two) spreading codes, each of said spreading codes being generated at timings different from a timing of a predetermined spreading code;

a signal distributor generating n parallel signals by dividing a serial input signal having n×m bits (m is an integer not less than one) per symbol timing into said n parallel signals each consisting of m bits;

n spectrum spreaders coupled to said signal distributor and coupled to said spreading code generator, said n spectrum spreaders generating n spectrum spread signals by spectrum-spreading said n parallel signals generated by said signal distributor in response to said n spreading codes generated by said spreading code generator;

a synthesizer coupled to said n spectrum spreaders and generating a synthesized output signal by synthesizing the n spectrum spread signals generated by said n spectrum spreaders; and a modulator coupled to said synthesizer and modulating said synthesized output signal generated by said synthesizer, and said reception apparatus comprising:

an input circuit generating a reception signal;

a correlator coupled to said input circuit and generating a correlated output signal by calculating a correlation between a baseband signal obtained from said reception signal and a spreading code used by said spreading code generator;

an equalizer coupled to said correlator and removing from said correlated output signal a delay distortion caused by a radio transmission path, and generating n equalized signals;

n demodulators coupled to said equalizer and demodulating said n equalized signals and extracting m-bit parallel signals; and a coupler coupled to said n demodulators and synthesizing the m-bit parallel signals generated by said n demodulators and outputting a serial signal.

8. A system according to claim 7, wherein said signal distributor means comprises:

a dividing unit dividing said input signal into said n parallel signals; and n delay units coupled to said dividing unit and delaying said n parallel signals, each of said n delay units having different delay amounts and respectively delaying said n parallel signals generated by said dividing unit by delays corresponding to timing differences between the n parallel signals.

9. A system according to claim 7, wherein said equalizer comprises:

a tap coefficient arithmetic unit determining a multipath distortion upon reception of a training signal on the basis of said correlated output signal from said correlator, said tap coefficient arithmetic unit outputting said multipath distortion as a tap coefficient;

an equalization arithmetic unit coupled to said tap coefficient arithmetic unit and generating a processed signal by equalization processing said correlated output signal generated by said correlator in response to said tap coefficient generated by said tap coefficient arithmetic unit; and a signal dividing unit coupled to said equalization arithmetic unit and dividing the processed signal generated by said equalization arithmetic unit into said n equalized signals.

10. A system according to claim 7, wherein said spreading code generator comprises:

a generation unit generating a spreading code constituted by a plurality of bits in units of bits at a chip period; and n delay units coupled to said generating unit and respectively outputting said n spreading codes, each of said n spreading codes having different delay amounts.

11. A system according to claim 7, wherein said correlator comprises:

a plurality of cascaded delay elements;

a plurality of multipliers, one of each coupled to one of said plurality of cascaded delay elements, each of said plurality of multipliers multiplying an output from said delay elements by +1 in accordance with said spreading code; and a plurality of adders, one of each coupled to one of said plurality of multipliers and coupled to a previous stage adder, each of said plurality of adders adding signals output from said previous stage adder and the respective multiplier, a last adder outputting a sum signal.

12. A system according to claim 7, wherein each of said n spreading codes is an 11-bit Barker code.

* * * * *